United States Patent [19]

Taylor

[11] Patent Number: 4,976,102
[45] Date of Patent: Dec. 11, 1990

[54] UNDUCTED, COUNTERROTATING GEARLESS FRONT FAN ENGINE

[75] Inventor: John B. Taylor, Cincinnati, Ohio

[73] Assignee: General Electric Company, Cincinnati, Ohio

[21] Appl. No.: 191,529

[22] Filed: May 9, 1988

[51] Int. Cl.$^5$ .............................................. F02K 3/072
[52] U.S. Cl. ................................ 60/226.1; 60/39.162; 416/129
[58] Field of Search .................. 60/116.1, 116.3, 39.23, 60/226.1, 262, 263; 416/170 R, 129

[56] References Cited

U.S. PATENT DOCUMENTS

| | | | |
|---|---|---|---|
| 2,404,767 | 7/1946 | Heppner | 416/129 |
| 4,688,995 | 8/1987 | Wright et al. | 416/129 |
| 4,738,591 | 4/1988 | Butler | 416/129 |
| 4,751,816 | 6/1988 | Perry | 416/129 |
| 4,790,133 | 12/1988 | Stuart | 60/39.162 |

FOREIGN PATENT DOCUMENTS

| | | | |
|---|---|---|---|
| 586570 | 3/1947 | United Kingdom | 416/129 |
| 594206 | 11/1947 | United Kingdom | 416/129 |

OTHER PUBLICATIONS

Treager, Irwin E. *Aircraft Gas Turbine Engine Technology*, McGraw Hill, New York; 1970, p. 9.

*Primary Examiner*—Louis J. Casaregola
*Attorney, Agent, or Firm*—Jerome C. Squillaro; Steven J. Rosen

[57] ABSTRACT

A gas turbine engine having a core for generating combustion gases, a power turbine, an unducted fan section and a booster compressor. The power turbine includes two counterrotating turbine blade rows which are interdigitized and serve to rotate counterrotating first and second drive shafts, respectively. The unducted fan section also includes counterrotating spaced apart variable pitch fan blade rows which are respectively connected to the first and second drive shafts. A booster compressor is axially positioned between the spaced apart fan blade rows. The booster compressor likewise includes first and second blade rows which are counterrotating and interdigitized and are likewise driven by the first and second drive shafts. The engine is supported by two stationary support frames to permit the nacelle to be nonstructural. The core engine is a modular unit so that it can be separable from the rest of the engine.

24 Claims, 7 Drawing Sheets

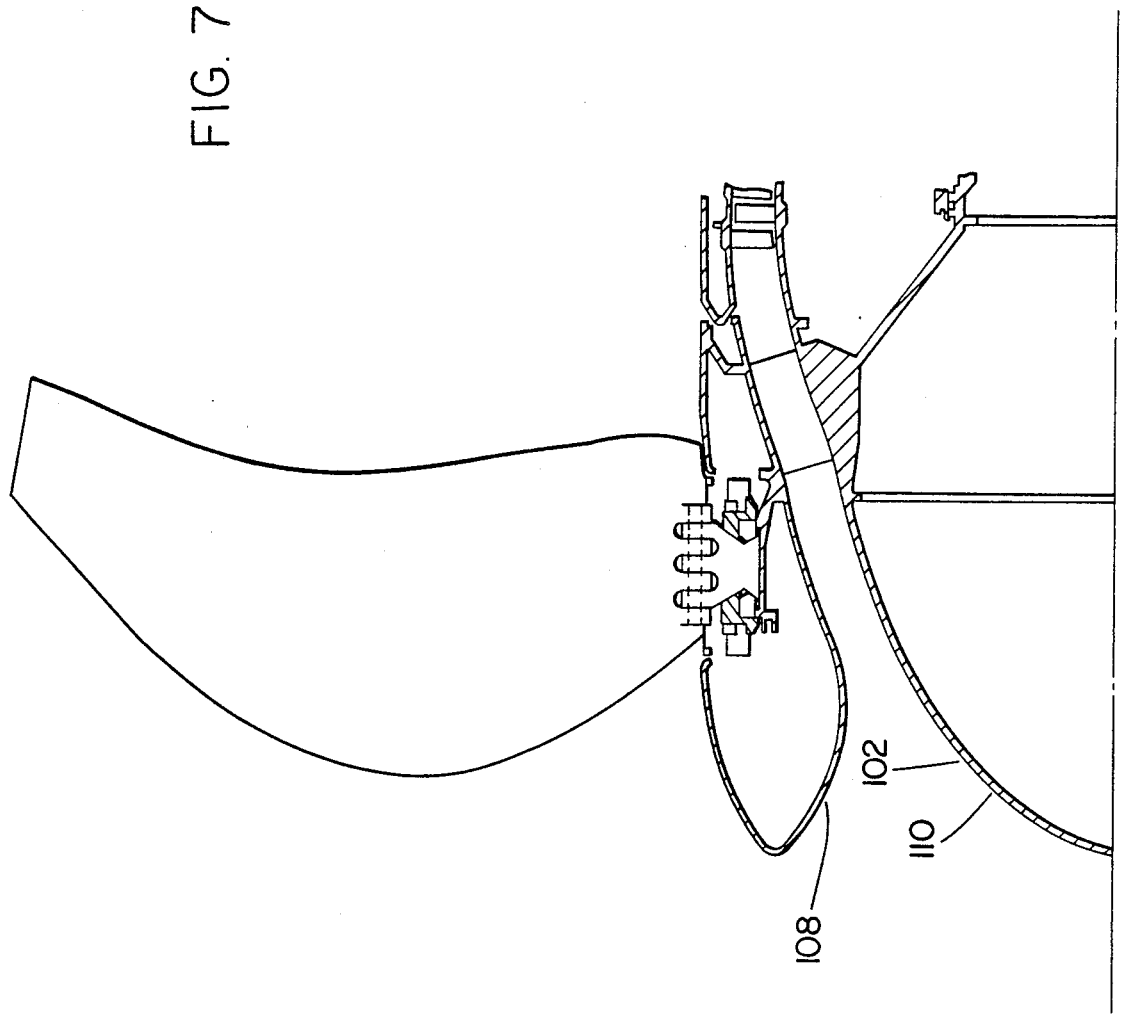

UNDUCTED, COUNTERROTATING GEARLESS FRONT FAN ENGINE

This invention relates to gas turbine engines, and more particularly, to an improved turbo fan engine with counterrotating rotors driving counterrotating unducted front fans as well as a counterrotating booster compressor.

BACKGROUND OF THE INVENTION

Conventional gear-driven single rotation turbo props are typically used at lower cruise speeds where they provide good performance and high efficiency. At higher cruise speeds, it is typically required to use a ducted turbo fan to produce the relatively high thrust required. A scaled up version of a conventional turbo prop engine suitable for powering an intermediate, or large sized transport aircraft at Mach 0.7 and 0.85 cruise speeds and high altitude would require excessively larger propeller diameters than is conventionally possible. The limiting factors of the single rotation propeller is the low power disk loading and reduced efficiency at high subsonic flight speeds.

The turbo machinery for aircraft having propellers are generally arranged to use a speed change gearbox in order to reduce the speed of the propeller rotor relative to the speed of the turbine. The speed change gearbox provides the method for a more optimum propeller tip speed for high efficiency along with a high speed, smaller diameter turbine drive shaft and a high speed turbine with fewer stages. However, a gearbox and associated accessories result in a significant increase in engine complexity, weight and inefficiency.

Unducted, counterrotating aft engines have been developed such as the GE 36 engine frequently referred to as the UDF engine. Such engines are direct driven without gearboxes. They are, however, generally mounted on the aft portion of the aircraft fuselage. Mounting such an aft fan engine on the wing of an aircraft is difficult due to the engine support pylon being forward of the large diameter fan.

A ducted, counterrotating gearless front fan engine forming a high bypass ratio engine has been submitted by the present inventor and assigned to the present assignee and is now co-pending under application Ser. No. 902,341, filed on Aug. 29, 1986.

OBJECTS OF THE INVENTION

It is accordingly, an object of the invention to provide an improved unducted, counterrotating, gearless front fan engine.

It is another object of the present invention to provide a gas turbine engine using counterrotating turbine sections which drive counterrotating unducted front fans and a counterrotating booster section.

It is a further object of the present invention to provide a gas turbine engine having a core engine, which is essentially a gas generator; a power turbine comprising two interdigitated counterrotating turbine rotors aft of the core engine; two counterrotating unducted fan blade sections forward of the core engine; and two counterrotating interdigitated booster compressor rotors spaced between the fan blade sections.

Another object of the present invention is to provide a gas turbine engine having two stationary support frames with a gas generating core engine supported therebetween and with the same stationary support frames supporting counterrotating turbine sections aft of the core engine and counterrotating unducted fan blade sections forward of the core engine with a counterrotating booster compressor between the fan blade sections.

A further object of the present invention is to provide a gas turbine engine having all of the engine parts supported by a pair of spaced apart stationary support frames and with the engine parts contained within an outer casing which is not a structural supporting member.

Yet a further object of the present invention is to provide an unducted, counterrotating gearless front fan engine and using either a pair of spaced apart forward swept fans, aft swept fans, or a combination of forward and aft swept fans.

Still another object of the present invention is to provide an unducted counterrotating gearless front fan engine having a variable pitch control for the fan blades and likewise one or more variable blade rows on the booster compressor.

SUMMARY OF THE INVENTION

The present invention provides turbo machinery for a very high bypass ratio, unducted front fan engine which does not use a gearbox between the fan and the free power turbine and also does not use a large number of booster and turbine stages. The engine consists of counterrotating fan sections connected to counterrotating power turbine rotors. The connecting counterrotating shafts between the fan sections and the turbine rotors pass through the center bore of a core engine. A counterrotating booster compressor is also operated by the same shafts. By utilizing a counterrotating booster and counterrotating turbine rotors, the number of booster and turbine stages can be generally reduced by a factor of two to four for a given level of efficiency and rotor speed. Typically such high bypass ratios are in the range of 20-35.

In an embodiment of the invention, the counterrotating booster is positioned axially between and counterrotating front and aft unducted fan sections. The engine is supported by two axially spaced apart stationary support frames including front and rear support frames. A core engine including a compressor, combustor and a high pressure turbine is supported from the two stationary support frames. The counterrotating turbine rotors are supported by the rear support frame aft of the core engine. The front support frame supports the counterrotating fan section and counterrotating booster compressor. An aircraft support pylon strut extends to the engine mounts on the front and rear support frames. An outer casing is provided about the engine with the outer casing providing no structural support for any of the engine parts.

In an embodiment of the invention, variable pitch controls are used to control the pitch of the axially spaced apart, counterrotating fan blades. The booster compressor can also have one or more variable booster blade rows which are part of a ganged-variable blade row design.

The fan blades of the spaced apart front fan sections can either be forward swept, aft swept, or a combination of forward and aft swept design.

BRIEF DESCRIPTION OF THE DRAWINGS

In the drawings:

FIG. 7 is a view of the forward part of the engine showing a short inlet centerbody.

In the various figures, like references designate like parts.

DETAILED DESCRIPTION OF THE INVENTION

Figure 1:
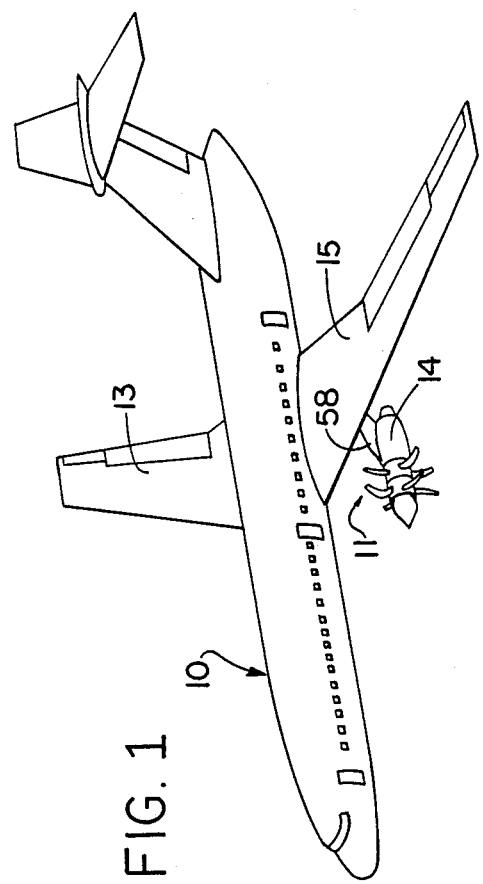
FIG. 1 is a perspective view showing an aircraft supporting an engine in accordance with an embodiment of the present invention.

Referring now to FIG. 1, there is shown an aircraft 10 supporting an engine 11 in accordance with one embodiment of the present invention. The aircraft 10 is shown having a pair of swept back wings 13, 15. Mounted on wing 15 is an unducted, counterrotating, gearless front fan high bypass ratio engine 11, in accordance with the present invention. Typically the high bypass ratio is in the range of 20-35. It will be noted, that such mounting is by means of a pylon 58 reaching down from the wing and supporting the engine. Because of the presence of the front fans, the mounting is facilitated with the pylon being rearward of the large diameter fan. This provides improved mounting arrangements, improved balancing of the engine appropriately from the wings, and avoids many of the problems heretofore encountered with aft mounted fans.

Figure 2:
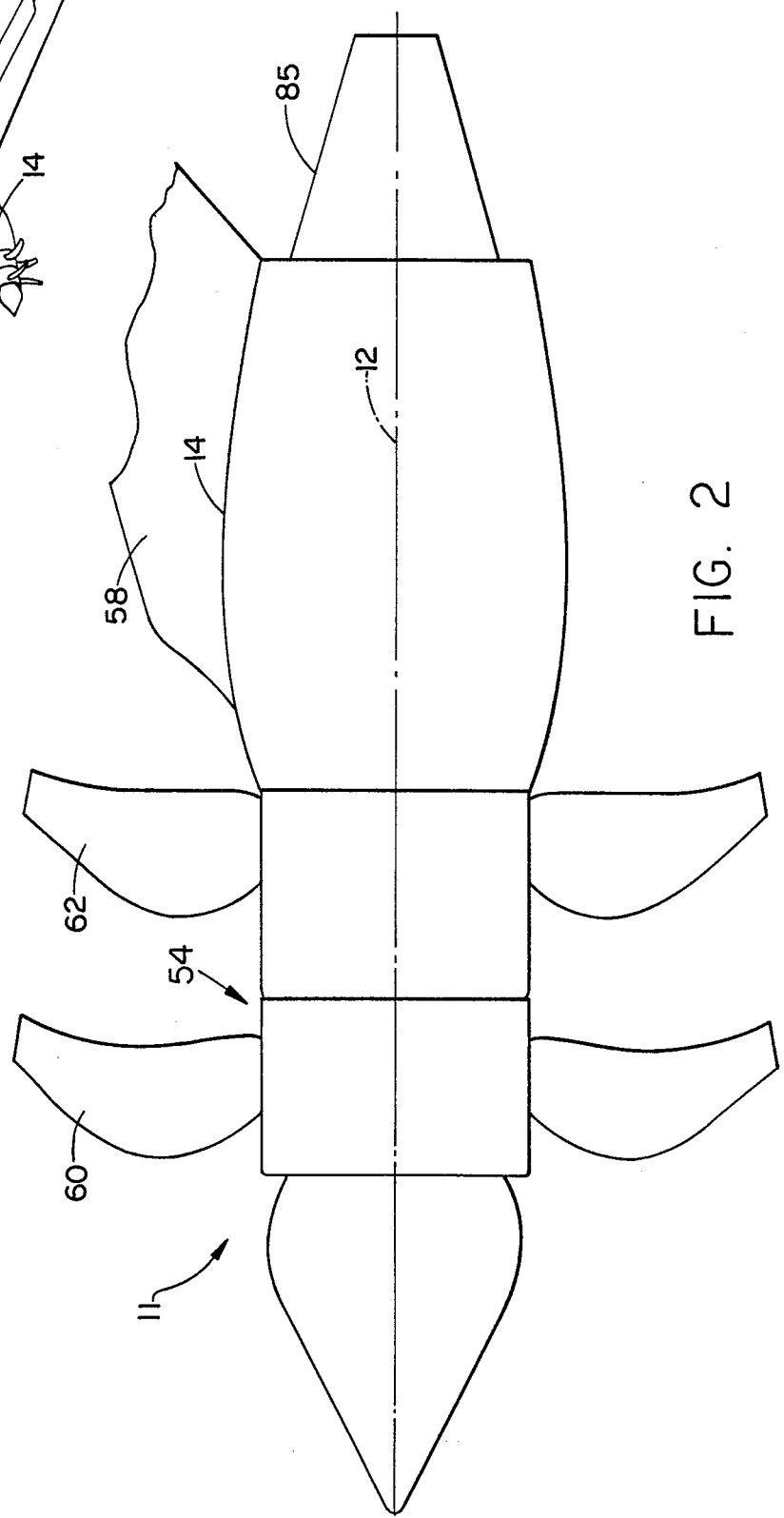
FIG. 2 is a side view of the engine shown in FIG. 1.
Figure 3A:
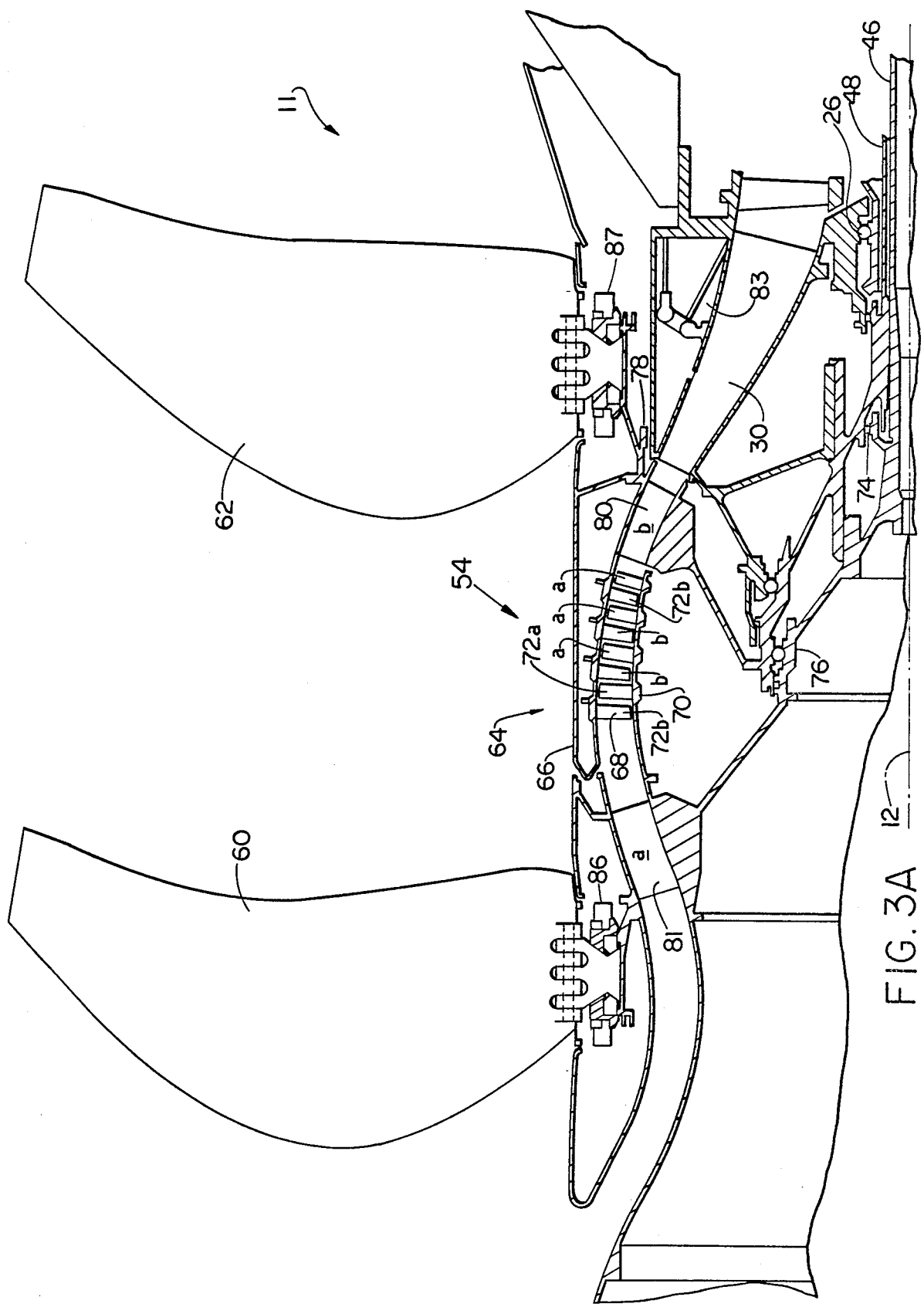
FIGS. 3A and 3B are a schematic cross section of an unducted, counterrotating, gearless front fan engine in accordance with one embodiment of the present invention.
Figure 3B:
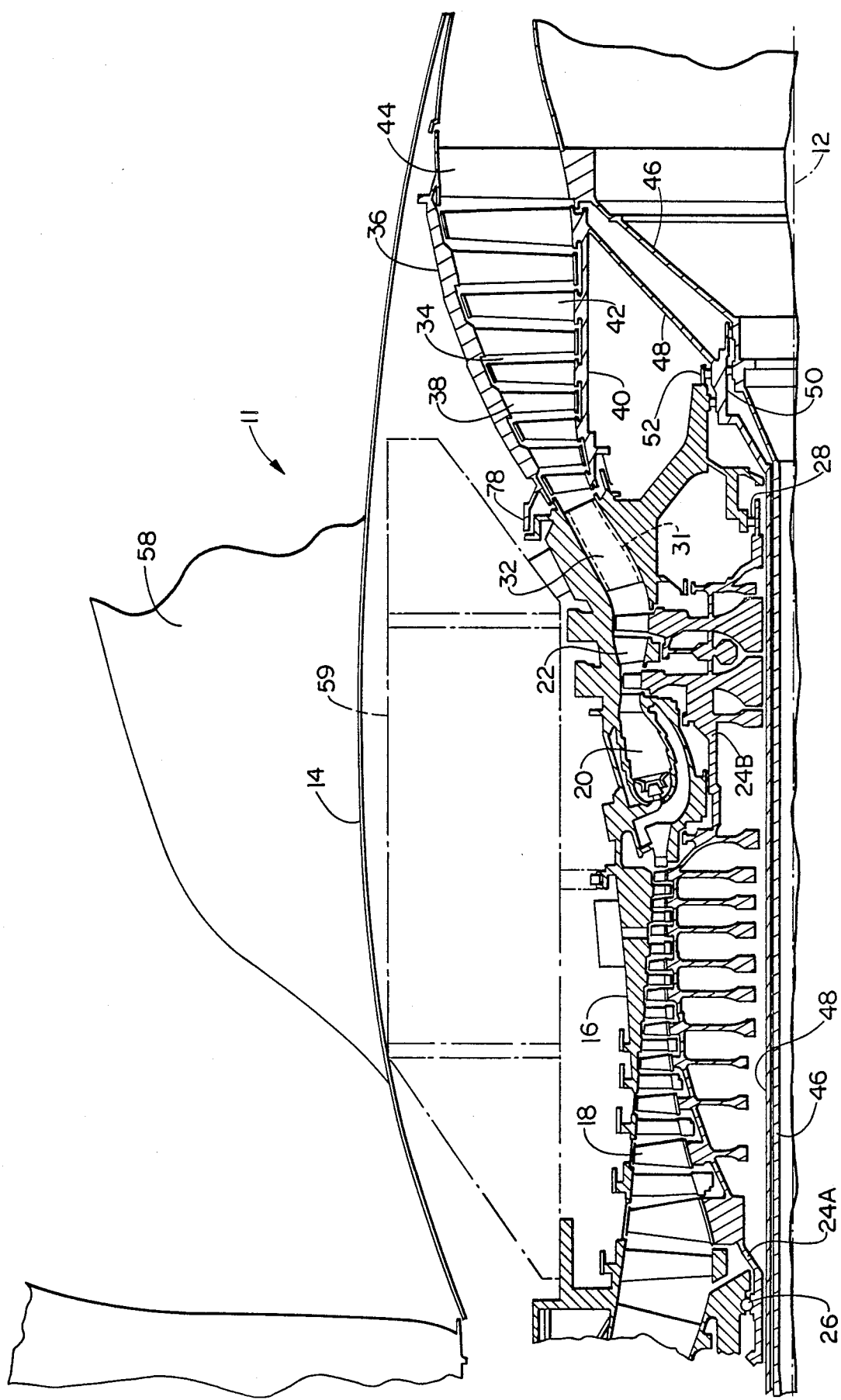

FIG. 2 shows a side view of the engine & FIGS. 3A and 3B compositely show a sectional view through the gas turbine engine 11 according to one embodiment of the present invention. Portions of FIGS. 3A and 3B overlap for ease of understanding. Engine 11 includes a longitudinal center line axis 12 and an outer casing 14 disposed co-axially about center line axis 12. As will hereinafter be explained in greater detail, outer casing conventionally referred to as a nacelle is nonstructural in that it does not support any of the engine components. It can therefore be constructed of thin sheet metal such as aluminum and/or composite material.

Engine 11 also includes a gas generator referred to as core engine 16. Such core engine includes a compressor 18, a combustor 20 and a high pressure turbine 22, either singular or multiple stage. The core engine 16 is modular in that it is a single unit and can be independently replaced separate from the other parts of the gas turbine. All of the parts of the core engine 16 are arranged coaxially about the longitudinal center line axis 12 of engine 10 in serial axial flow relationship. Annular drive shafts 24A and 24B fixedly interconnect compressor 18 and high pressure turbine 22. High speed bearings 26 & 28 rotationally support the core 16.

The core engine 16 is supported on two stationary support frames including the front support frame 30 and the rear support frame 32. These stationary support frames 30 and 32 (shown in FIGS. 3A and 3B) also support the other parts of the engine. The engine components do not depend from the outer casing 14 thereby permitting the outer casing 14 to be a non-structural element which may be part of the engine nacelle. The core engine 16 is effective for generating combustion gases. Pressurized air from compressor 18 is mixed with fuel in combustor 20 and ignited, thereby generating combustion gases. Some work is extracted from these gases by high pressure turbine 22 which drives compressor 18. The remainder of the combustion gases are discharged from the core engine 16 through a diffuser section 31 into the power turbine 34.

Power turbine 34 includes an outer annular drum rotor 36 rotatably mounted on the rear support frame 32. The outer rotor 36 includes a plurality of first turbine blade rows 38 extending radially inward therefrom and axially spaced from each other.

Power turbine 34 also includes an inner annular drum rotor 40 disposed radially inwardly of outer rotor 36 and the first blade rows 38. The inner rotor 40 includes a plurality of second turbine blade rows 42 extending radially outwardly therefrom and axially spaced from each other.

A rotating frame support 44 provides the support for the outer drum rotor 36 and first blade rows 38. This support in turn is carried by the rear support frame 32. Extending from the rotating frame support 44 is an inner shaft 46. An outer co-axial shaft 48 is connected to the inner drum rotor 40. Differential bearing sets 50 and 52 are disposed between the rotating shafts 46 and 48.

The core engine 16 with its high speed rotation forms a separate modular unit with its own high speed bearings. Therefore, the differential bearings sets 50 and 52 supporting the shafts 46, 48 can be low speed bearings. The differential bearing arrangement can include one bearing supported by the other.

Each of the first and second turbine blade rows, 38 and 42, respectively comprises a plurality of circumferentially spaced turbine blades, with the first turbine blade rows 38 alternately spaced with respect to ones of the second turbine blade rows 42. This arrangement of blade rows of the two rotors is referred to as being interdigitated. Combustion gases flowing through the blade rows 38 and 42 drive the inner and outer drum rotors 36, 40 in counterrotating directions. Thus, the shafts 46 and 48 will also be rotating in counterrotating directions. The shafts 46, 48 are co-axially disposed relative to the longitudinal center line axis 12 of the engine 10 and extend forward through the core engine 16.

At the forward part of the engine 10, there is provided a front fan section 54. Fan section 54 includes a first fan blade row 60 connected to a forward end of the inner counterrotating shaft 46 which extends between the power turbine and the fan section. Front fan section 54 includes a second fan blade row 62 connected to the forward end of the outer drive shaft 48 also connected between the power turbine and the fan section. Each of the first and second fan blade rows 60 and 62 comprises a plurality of circumferentially spaced fan blades. Fan blade rows 60 and 62 are counterrotating which provides a higher disk loading and propulsive efficiency. It should be appreciated that the counterrotating fan blade row 62 serves to remove the swirl on the circumferential component of air imparted by the counterrotating fan blade row 60.

Figure 4:
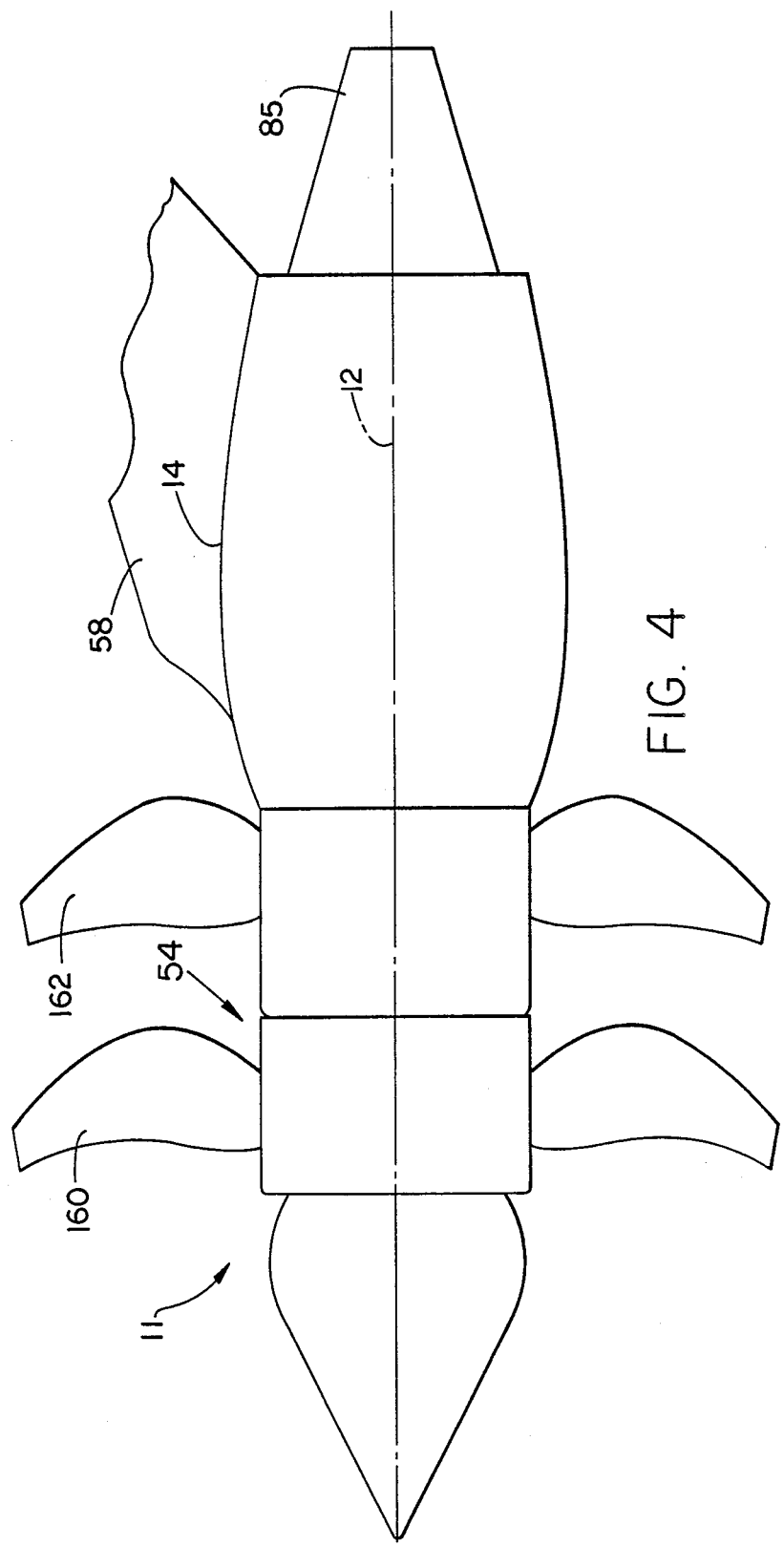
FIG. 4 is a view similar to that of FIG. 2 and showing both fan blade rows being forward swept.
Figure 5:
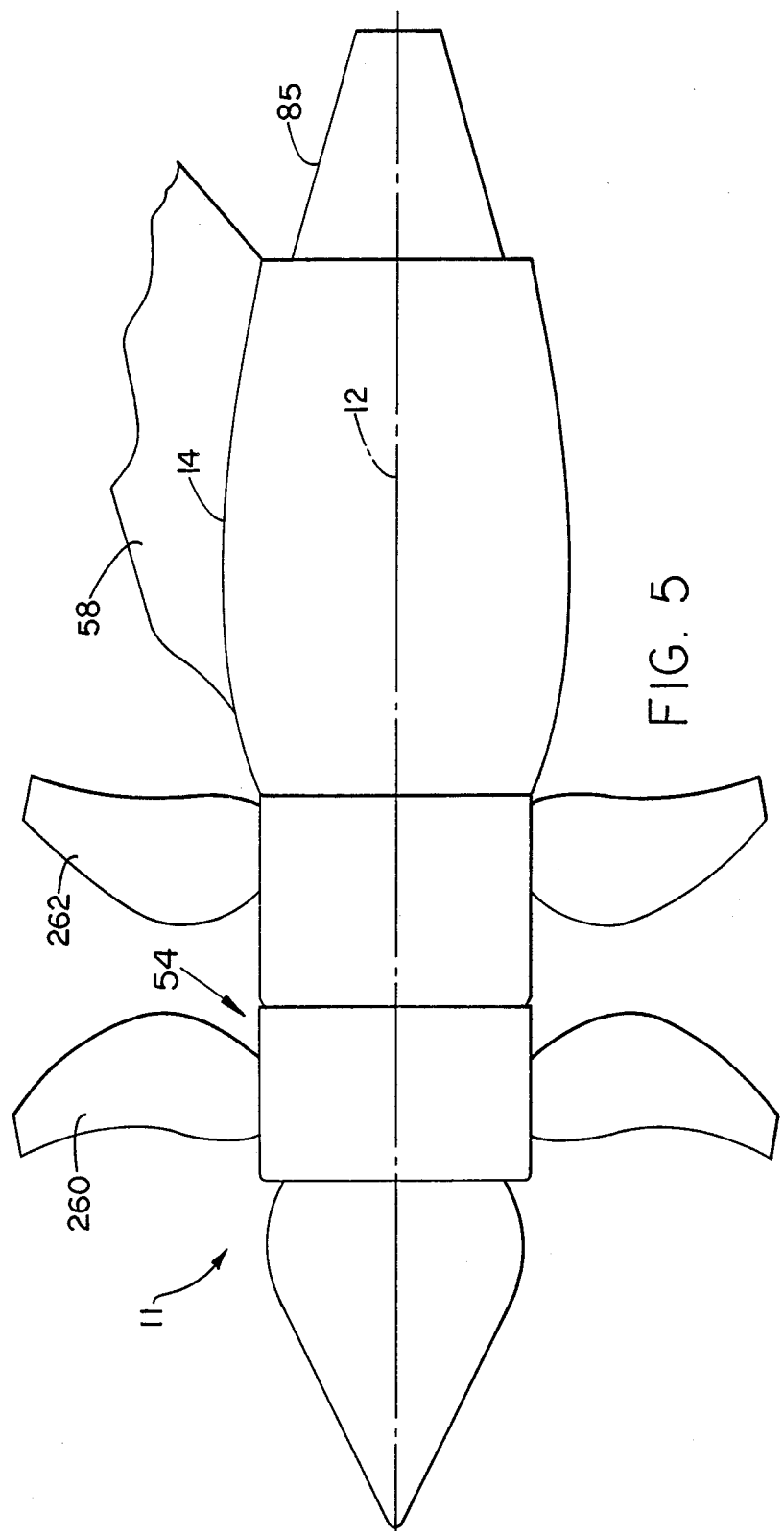
FIG. 5 is a view similar to that shown in FIG. 2 and showing the forward fan blade row being forward swept and the aft fan blade row being aft swept.

The fan blades in rows 60 and 62 may be either an aft swept or a forward swept design. FIG. 4 shows a side view similar to that shown in FIG. 2 wherein like parts are identically indicated. However, in FIG. 4, the blades 160 of the forward blade row and the aft blades 162 of the aft blade row are both forwardly swept. Likewise, FIG. 5 is again a schematic view similar to that shown in FIG. 2 wherein like parts are identically indicated. In this case, however, the blades 260 of the forward blade row are forwardly swept while the aft blades 262 of the aft blade row are rearwardly swept.

Referring back to FIGS. 3A and 3B the fan blades in rows 60 and 62 are mounted such that their pitch angle, or aerodynamic incidence angle, can be mechanically varied to optimize the performance of the engine for maximum thrust or minimum specific fuel consumption and/or reduced noise level. In addition, the variable pitch mechanism 86 and 87 serve to reverse the direction of the fan airflow for reverse thrust purposes. Various mechanisms are possible to provide actuation to the fan blades as is well known in the art.

Engine 10 further comprises a booster compressor 64. Booster compressor 64 includes an outer annular rotor 66 which also serves as the independent intake end of the main flow path through the engine. A plurality of first compressor blade rows 68 extend radially inwardly from outer rotor 66 and are axially spaced from each other. Booster compressor 64 also includes an inner annular rotor 70 disposed inwardly of the outer annular rotor 66 and includes a plurality of second compressor blade rows 72 extending radially outwardly therefrom and axially spaced. The first and second compressor blade rows 68, 72 are interdigitated and are counterrotating. The outer rotor 66 is fixedly attached to fan blade row 62 as well as a forward end of the outer shaft 48. Similarly, inner rotor 70 is fixedly attached to fan blade row 60 and the forward end of the inner shaft 46.

Each of the first and second compressor blade rows 68, 72 comprise a plurality of circumferentially spaced compressor blades with the blade rows alternating with each other. Compressor blade rows 68 and 72 are counterrotating and located in the flow passage leading to the core engine 16.

The counterrotating booster compressor 64 provides a significant pressure rise to air entering the core engine 16. An advantage of having the fan blade rows and the compressor blade rows driven by the same drive shaft is that energy is optimally extracted from the power turbine 34. Without the booster compressor stages being driven by the power turbine from shafts 46 and 48, a separate compressor with an additional shaft and drive turbine would be required. The counterrotating booster compressor 64 gives sufficient pressure rise despite the slow fan speed. By having compressor blade rows 68 and 72 counterrotating, a lessor number of compressor blade rows than that required for a single low speed compressor driven from only one shaft is possible. The booster compressor 64 has a separate intake forward of the fan blades which permits fan operation in the reverse flow mode without adversely affecting operation of the booster compressor. Substantially all (at least 80%) of the thrust comes from the fan section 54 and only a small portion comes from the exhaust nozzle.

At the front end of the shafts 46 and 48 there are likewise provided two sets of differential bearings 74 and 76, of which bearing set 76 is a differential. These likewise do not support the high speed bearing 26 and 28 about which the core engine rotates. Rotating frame 80 comprising a plurality of struts having aerodynamic shape acting as blades to compress, is provided to support the fan blade row 62 as well as the outer booster case and blades. The rotating frame 80 is in turn supported by the stationary support frame 30. Rotating frame 81, similarly constructed as frame 80, is provided to support the fan blade row 60. These frame 80 and 81 counter rotate with respect to each other. A series of seals 78 are appropriately provided for retaining the flow within the engine passageways.

An important feature of the present invention is the positioning of the booster compressor 64. In order to reduce the noise resulting from the fan blade rows 60 and 62, sufficient spacing must be provided between the fan blade rows. The spacing should preferably be one and one half times or more than the aero chord length of the fan blades of the fan blade row 60. There should also be a spacing between the blade row 62 and the pylon 58. Preferably such spacing should be about one aero chord length or more of the fan blades in the fan blade row 62. The aero chord, often referred to as the pitch line chord, is conventionally defined as the chord at a radial distance from the root of the blade to the tip of the blade which divides the blade into two portions of equal area.

Accordingly, the axial spacing between the fan blade rows 60 and 62 is used for positioning of the counterrotating booster blade rows 68 and 72. The booster compressor 64 is therefore contained within the length of the fan blade rows and is positioned in parallel with the air flow.

Along the flow path through the engine, and positioned forward and aft of the booster compressor 64 are the forward and aft rotating frames 80 and 81, respectively. Aft rotating frame 80 is connected to the outer rotor 66 and rotates along with the booster compressor blades 68 and forward rotating frame 81 is connected to the inner rotor 70 and rotates along with the booster compressor blades 72. In this manner, the booster compressor 69 can be considered as a ten stage booster with the booster sections of one blade row being identified with the letter a and the booster sections of the other blade row being identified with the letter b. Booster blade rows b mounted in the outer rotating case may be either a fixed blade row or a ganged-variable blade row design. When they are a ganged-variable blade row the booster airflow—rotor speed relationship can be changed to provide improved engine performance and/or increased booster operating stability during take-off and reverse thrust operation.

By means of the variable blades of the vanes of the booster compressor, in combination with the variable pitch fan blades, numerous benefits can be obtained. For example, if the fan blades are closed down by sufficiently decreasing the pitch angle of the fan blades, we can also close down the boosters by sufficiently decreasing the pitch angle of the booster blades. Thus, if an ice-up condition were to occur, we could run the rotor faster with the same power level and shed the ice simply by the speed of the blades. Likewise, it is also possible to open up the pitch and slow down for landing therebY having a reduced noise condition.

A feedback control system could also be included whereby control of the fan and boosters could be automatically controlled as a result of sensing various conditions with respect to the gas engine. The variable position control for the booster compressor blades could be achieved by bringing in an hydraulic line through the use of a hydraulic slip ring with the hydraulic line connected to the rotor vane. Such hydraulic lines are well known in the art. It would only be necessary to control the outside booster rotor blades without necessarily controlling both sets of blades on the compressor.

Bleed doors 83 are provided in order to adjust the pressure along the flow path. The pressure ratio to the booster section 64 is higher than the fan pressure ratio and the bleed doors serve to control the stall margin on the boosters. When the bleed doors are opened, the air dumps out behind the fan. The pumping characteristics of the low pressure booster and the pumping characteristics of the core are not the same. They are matched up at high speed where the engine is normally run. However, at low speed, in order to avoid stall it is necessary to relieve the pressure to eliminate any back pressure. Through the use of ganged-variable booster blades there may be no need for the bleed doors.

The forward and aft stationary support frames 30 and 32 respectively include fixed arms extending therefrom and supporting the core engine 16. Likewise, the power turbine 34 is supported from the aft support frame 32 and the fan sections 54 and booster compressor 64 are supported by the forward support frame 30.

The engine components are all supported by the two stationary support frames 30 and 32. The outer casing or nacelle 14 is therefore non-structurally supporting. The end exhaust system 85 continues to rotate around the shaft 46. In this way, it need not be supported by the outer casing. However, if desired, the end nozzle could be separated and a structural support could be extended between the outer casing 14 and the end exhaust system. In this case, however, it would be necessary to provide the casing 14 with additional structural rigidity. The engine is supported from the pylon 58 which reaches down through outer casing 14 through the arm 59 and mounts onto the stationary support frames 30 and 32.

The core engine itself can typically be the GE/-NASA E³ core engine whose specifications are available. However, since the core engine is an integral unit by itself, it is possible to replace this engine with other engines such as the CF6 core or the CFM 56 core, or others.

Typically, the fan blade rows 60 and 62 will rotate at substantially the same speeds and in the preferred embodiment may be of the variable pitch type which can be adjusted through known techniques to modify the speeds to desired values.

Figure 6:
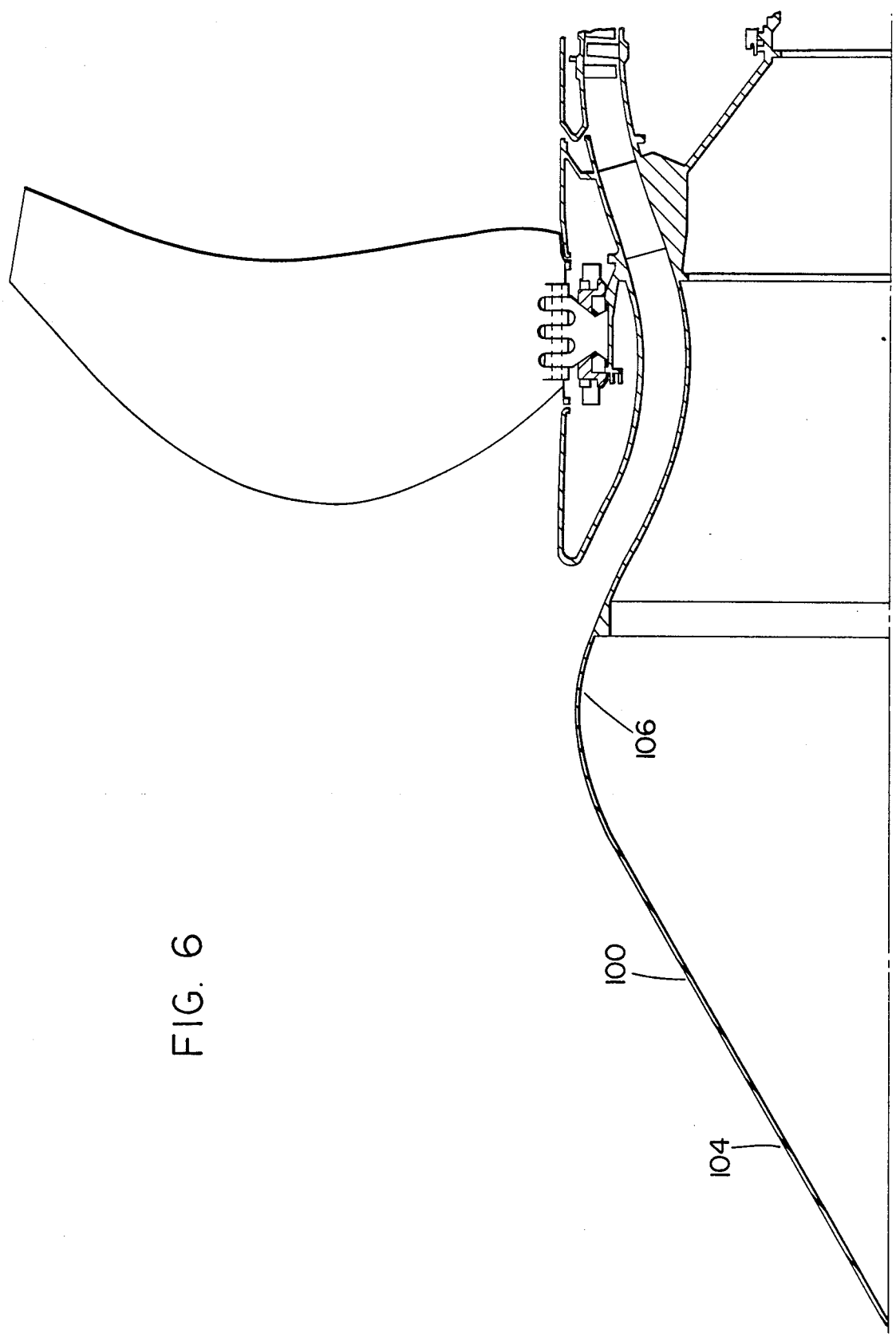
FIG. 6 is a view of the forward part of the engine showing a long inlet centerbody.

The inlet duct to the booster compressor may be provided by either a long inlet centerbody or a short inlet centerbody. FIG. 6 shows an upper-half view of a typical long inlet centerbody 100 and FIG. 7 shows a short inlet centerbody 102. The long inlet centerbody includes a long sloping front 104 with a rise 106 and provides protection to the booster compressor from birds and ice strikes; however, access to adjacent aircraft doors may be restricted by the long inlet centerbody. The short inlet centerbody gives a wider entry 108 and a stub nose 110 under the fan 60 and gives greater access to the panels.

The aforementioned engine utilizes a counterrotating front fan section driven by a counterrotating turbine. The fan blade rows contain therebetween booster compressor stages which are used to super charge the core engine. The number of booster compressor stages depend upon the degree of super charging desired. The number and size of the counterrotating turbine stages depend upon the power requirement and the desired level of efficiency. Because of the direct drive arrangement, a fairly large number of turbine stages are needed. For example the number of stages in each rotating direction would be between 6 and 12 and the number of aft blades may be different from the number of forward blades. The core engine consists of a compressor, combustor, and turbine with an adequate sized center bore to accommodate the counterrotating turbine shafts. The core engine can be designed to have varying requirements and disk bore stress levels which are within available means.

It is noted, that the engine is gearless and yet a very high bypass ratio unducted front fan engine is achieved which can provide a significant reduction in specific fuel consumption without the complexity of the gearbox and associated accessories. Bypass ratios greater than 30 can be achieved and horsepowers of greater than 50,000 possible.

It should thus be appreciated, that the present invention is a hybrid of the two engines previously discussed. Specifically, it has features of the aforementioned co-pending ducted front fan, gearless direct drive engine. However, it eliminates the duct and has various other changes. It is also similar to the UDF engine in that it uses variable pitch on the fans. However, it uses forward fans rather than the aft fans. Furthermore, it can include variable vane control on the booster compressors.

Such type of fan, it should be noted, is well suited for wing mounting on a large military transport, such as the C5 or C17. Specific fuel consumption improvement would be about 20%.

Numerous modifications, variations, and full and partial equivalents can be undertaken without departing from the invention which is limited only by the appended claims.

What is desired to be secured by Letters Patent of the United States is the following:

What is claimed is:

1. A high bypass ratio gas turbine engine comprising:
   a core engine effective for generating combustion gases passing through a main flow path;
   a power turbine aft of said core engine and including first and second counter rotatable interdigitated turbine blade rows effective for counterrotating first and second drive shafts, respectively;
   an unducted fan section forward of said core engine including a first fan blade row connected to said first drive shaft and a second fan blade row axially spaced aftward from said first fan blade row and connected to said second drive shaft, and
   a booster compressor axially positioned between said first and second fan blade rows and including a plurality of first compressor blade rows connected to said first drive shaft and a plurality of second compressor blade rows connected to said second drive shaft.

2. A high bypass ratio gas turbine engine as in claim 1, wherein said first and second compressor blade rows are interdigitated.

3. A high bypass ratio gas turbine engine as in claim 1, wherein said first and second unducted fan blade rows are axially spaced apart approximately one and a half times the aero chord length of a blade of the first blade row.

4. A high bypass ratio gas turbine engine as in claim 1 and comprising a pylon for supporting the engine, and wherein the pylon is spaced from the second fan blade row by approximately one aero chord length of a blade of the second blade row.

5. A high bypass ratio gas turbine engine as in claim 1, wherein the booster compressor intake is separate from the fan airflow path and forward of the fan section.

6. A high bypass ratio gas turbine engine as in claim 1, and comprising means for varying the aerodynamic incidence angle of fan blades in said first and second fan blade rows.

7. A high bypass ratio gas turbine engine as in claim 1, wherein, the blades in both said compressor blade rows are fixed pitch blades.

8. A high bypass ratio gas turbine engine as in claim 2, wherein one of said plurality of compressor blades of said compressor blade rows are ganged together and coupled to a variable blade control mechanism to vary the pitch of the blades in at least one compressor blade row.

9. A high bypass ratio gas turbine engine as in claim 1, wherein fan blades in said first and second fane blade rows are all forward swept.

10. A high bypass ratio gas turbine engine as in claim 1, wherein said fan blades are all aft swept.

11. A high bypass ratio gas turbine engine as in claim 1, wherein one fan blade row comprises forward swept blades and the other fan blade row comprises aft swept blades.

12. A high bypass ratio gas turbine engine as in claim 11, wherein the blades of the first blade row are forward swept and the blades of the second blade row are aft swept.

13. A high bypass ratio gas turbine engine as in claim 1, and further comprising a bleed door positioned between said booster compressor and said core engine for relieving the back pressure on the booster compressor to control the stall margin.

14. A high bypass ratio gas turbine engine as in claim 1, and further comprising two counterrotating frames positioned along the main flow path, a respective one on either side of the booster compressor.

15. A high bypass ratio gas turbine engine as in claim 1, further comprising a pair of spaced apart annular stationary support frames on either side of the core engine, one of which is aft of the booster compressor and the other of which is forward of the power turbine.

16. A high bypass ratio gas turbine engine as in claim 15, and comprising an outer non-structurally supporting nacelle.

17. A high bypass ratio gas turbine engine as in claim 16, further comprising an exhaust system which rotates with one of said shafts.

18. A high bypass ratio gas turbine engine as in claim 1, wherein said core engine is removable.

19. A high bypass ratio gas turbine engine as in claim 1, wherein the bypass ratio is between 20 and 35.

20. A high bypass ratio gas turbine engine as in claim 1, further comprising a sharp conical inlet centerbody forward of said fan section.

21. A high bypass ratio gas turbine engine as in claim 1, further comprising a blunt spherical stub nose inlet centerbody forward of said fan section 22. A high bypass ratio gas turbine engine comprising:
a core engine;
a power turbine aft of said core engine;
an unducted fan section forward of said core engine coupled to said power turbine and comprising fan blades;
a booster compressor axially positioned between at least a part of said fan section and said core and including booster compressor blades;
means for varying the pitch on said fan blades, and
means for varying the pitch on said booster compressor blades, whereby the speed of the engine can be controlled through varying the pitch on both the fan and the booster compressor blades while maintaining the power level of the engine.

23. A high bypass ratio gas turbine engine as in claim 22, and comprising means for closing down the fan blades by decreasing the respective pitch angles of the blades and the booster compressor blades whereby the speed is increased for the same power level.

24. A high bypass ratio gas turbine engine as in claim 22, and comprising means for increasing the respective pitch angles of said fan blades and said booster compressor blades for slowing down the engine with a reduced noise condition.

* * * * *